H. KLECKLER & C. G. MacGREGOR.
FLYING BOAT HULL.
APPLICATION FILED OCT. 12, 1916.

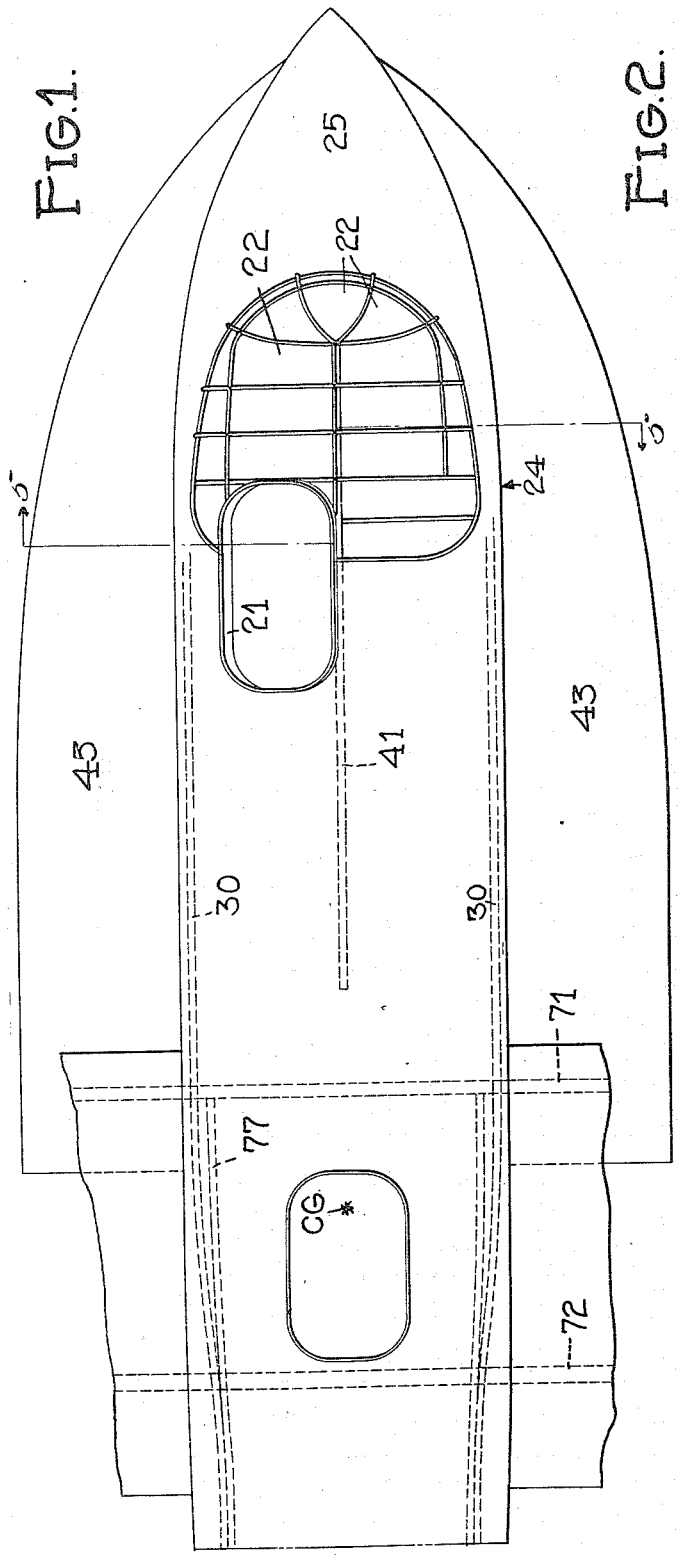
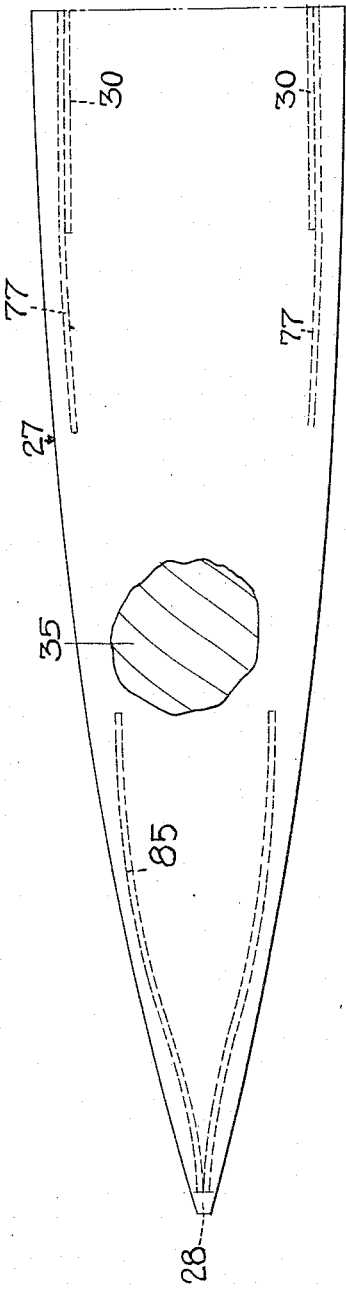

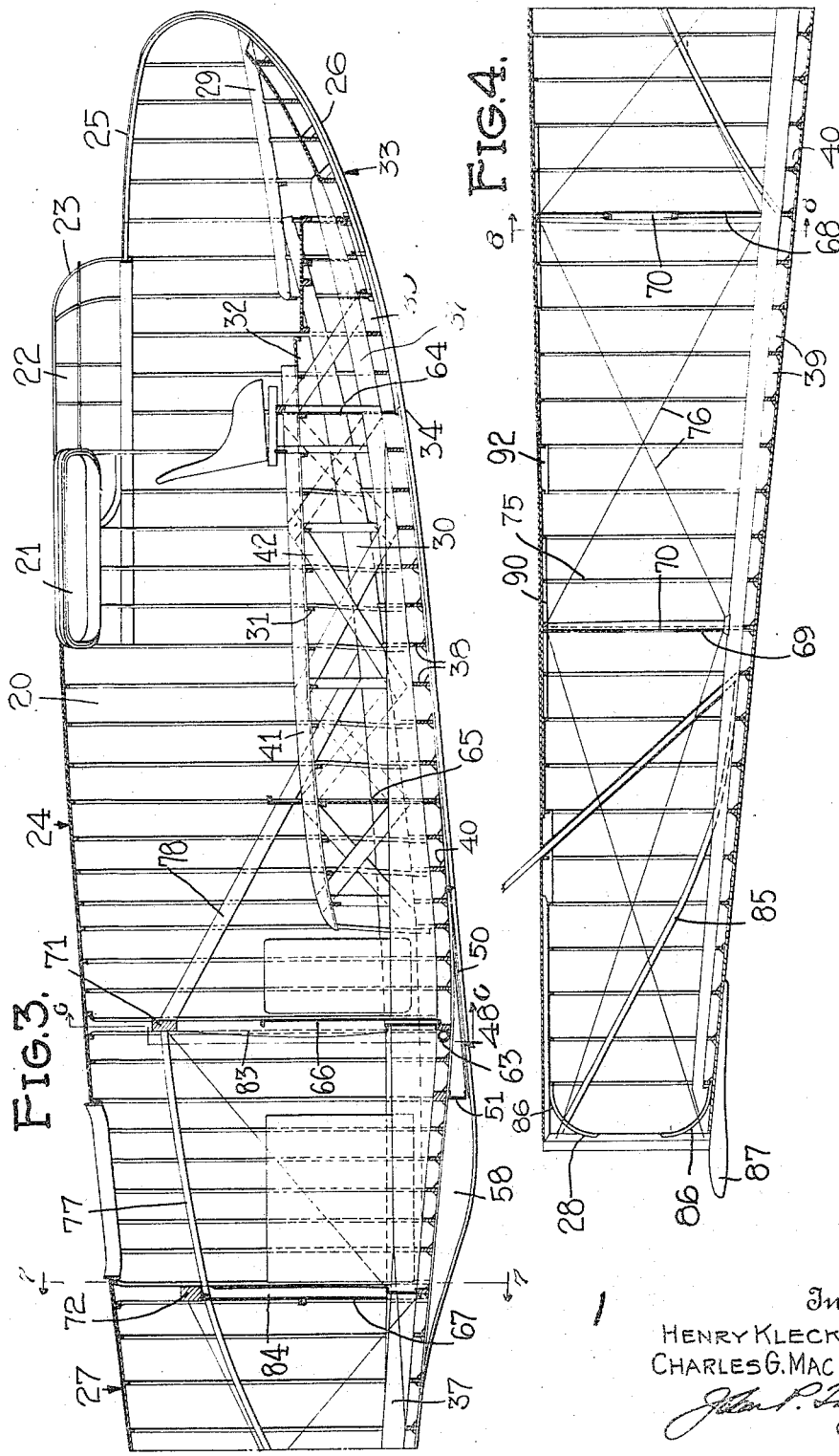

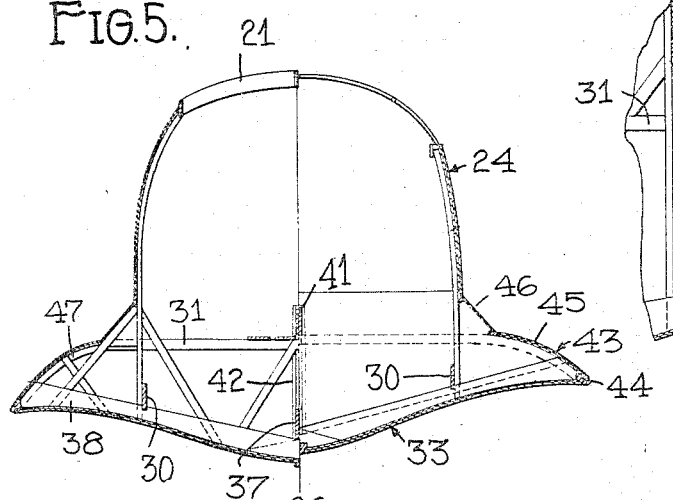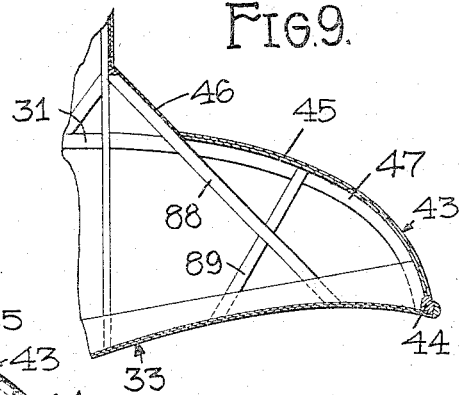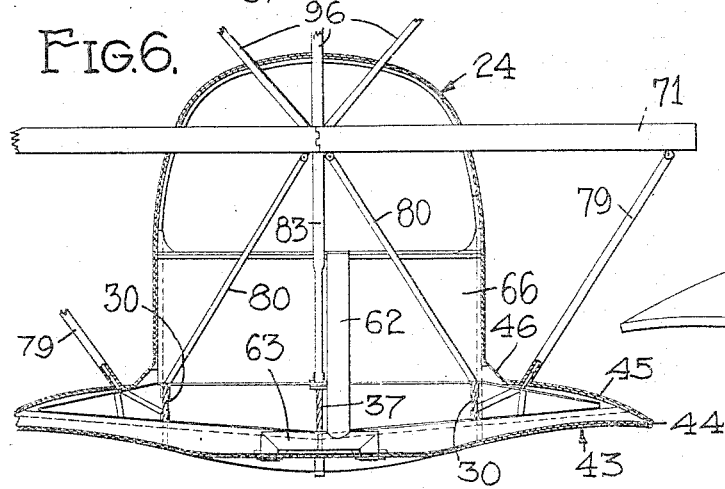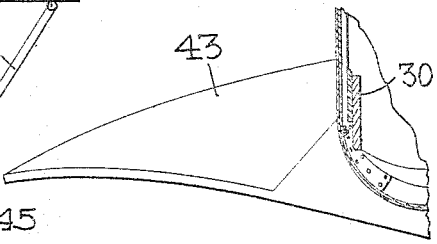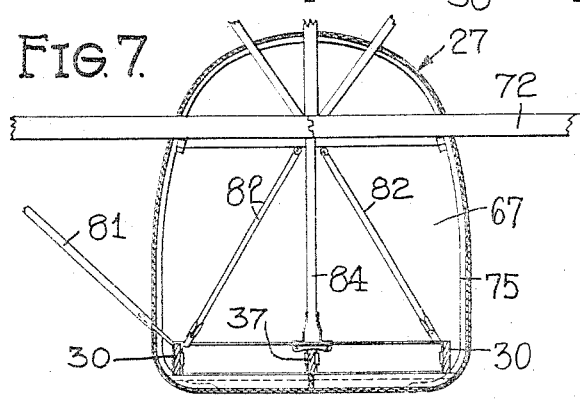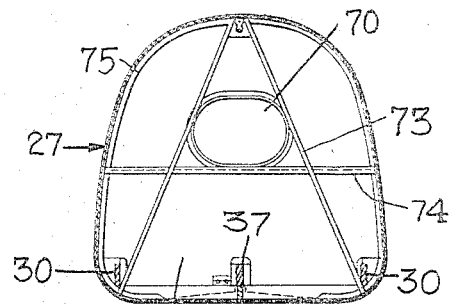

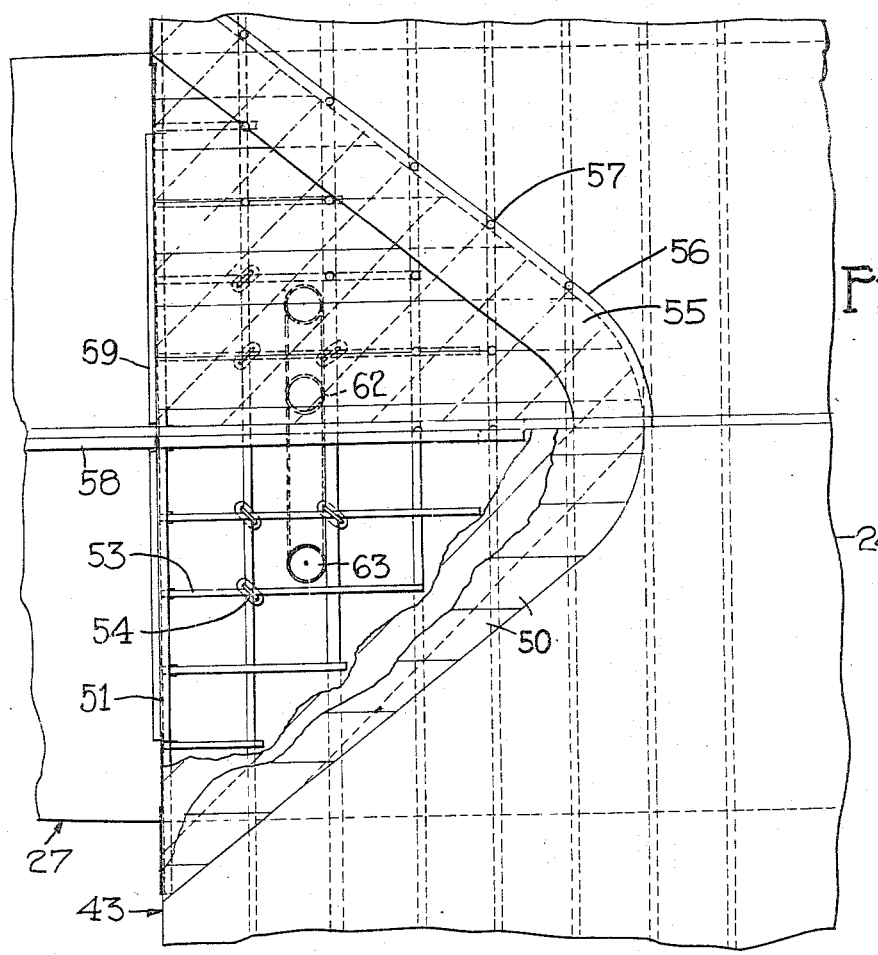
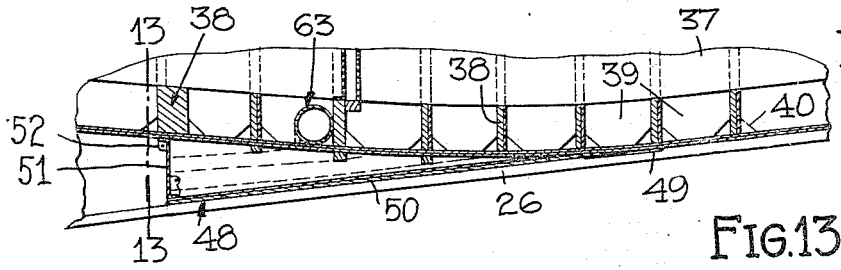
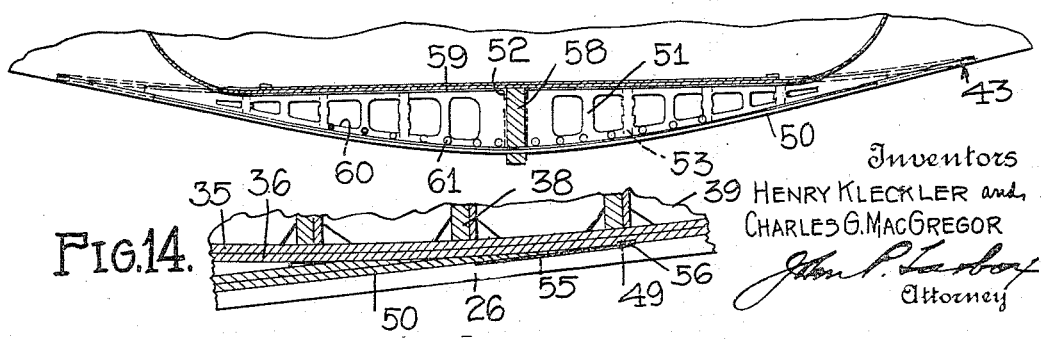

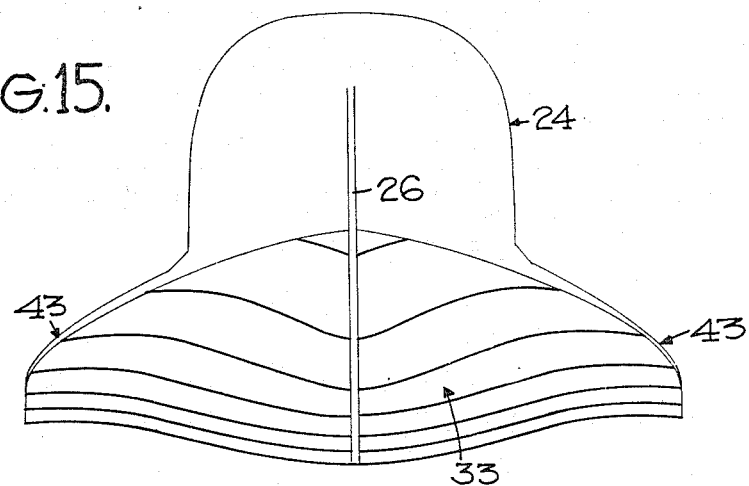
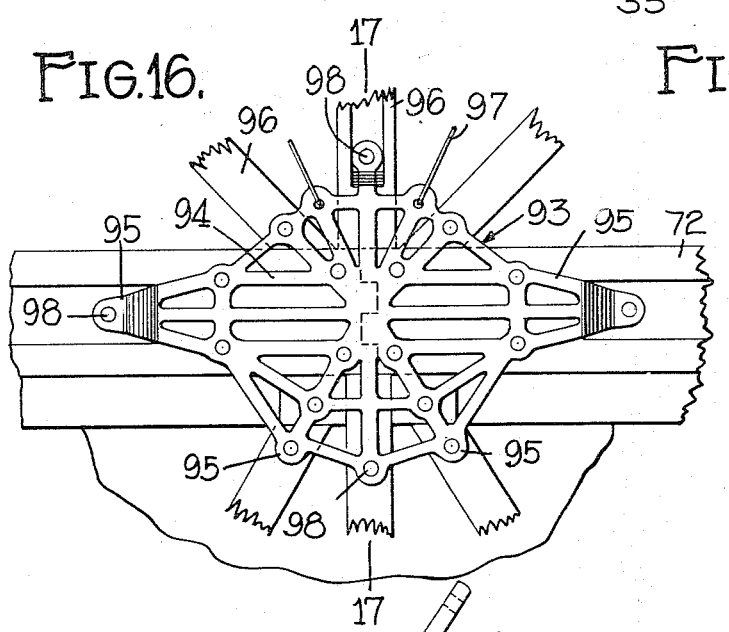
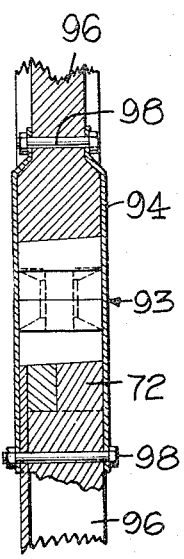
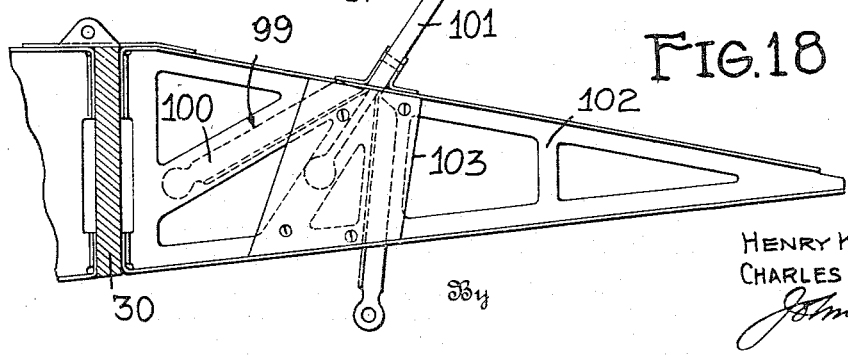

1,285,229.

Patented Nov. 19, 1918.
6 SHEETS—SHEET 6.

Inventors
HENRY KLECKLER and
CHARLES G. McGREGOR.

By
Attorney

UNITED STATES PATENT OFFICE.

HENRY KLECKLER AND CHARLES G. MacGREGOR, OF BUFFALO, NEW YORK, ASSIGNORS TO CURTISS AEROPLANE AND MOTOR CORPORATION, A CORPORATION OF NEW YORK.

FLYING-BOAT HULL.

1,285,229.　　　　　Specification of Letters Patent.　　Patented Nov. 19, 1918.

Application filed October 12, 1916. Serial No. 125,183.

*To all whom it may concern:*

Be it known that we, HENRY KLECKLER, a citizen of the United States, and CHARLES G. MACGREGOR, a subject of the King of Great Britain, residing at Buffalo, in the county of Erie and State of New York, have invented certain new and useful Improvements in Flying-Boat Hulls, of which the following is a specification.

Our present invention relates to hydroplane boats or hulls of the type used ordinarily in connection with hydroaeroplanes or flying boats.

Flying boat hulls of this character are usually provided with a comparatively blunt bow or nose which widens abruptly to a maximum substantially amidships. From the amidships portion, the hull tapers gradually rearwardly into what is commonly termed the tail. There is thus evolved (in plan) a hull of almost perfect stream-line form. In elevation, a hydroplaning bottom of V-shape in transverse section is provided to extend rearwardly from the bow throughout the maximum beam amidships. This bottom has its bow angled more acutely than the remaining portion and is continued laterally beyond the chines of the hull by coextensive fin excrescencies. A transverse step terminates this hydroplaning area and forms a line of demarcation between the fore-body of the hull and its extended tail. The hull, in the vicinity of the step, carries the aerial supporting surfaces and aft on its tail portion the control and fixed stabilizing surfaces or empennage. Its cabin affords accommodations for the flying crew.

The improvements herein more particularly referred to are directed almost wholly to the hull structure *per se*. It is proposed, first, to provide a keelson and bottom planking arrangement in which a maximum of strength is obtained not only at the rearwardly facing step but at the very point where the greatest impact is in evidence while hydroplaning; second, to provide, in lieu of the integral form of built-in step, a detachable or non-integral false step structure in which the false step bottom planking merges forwardly into the underneath hydroplaning surface of the hull and in which, if required, the false step proper may be adjusted fore and aft to insure its efficient disposition relatively to the center of gravity of the craft; third, to provide a false step structure of a configuration substantially complemental to the underneath surface of the hull; fourth, to provide a false step structure capable of securement against the underneath surface of the hull proper without interrupting the continuity of either the keelson or the hull bottom; fifth, to provide a false step structure in which the bottom planking not only forms part and parcel of the hydroplaning area but extends the said area considerably rearwardly and to a point beyond the apex of the saliency which characterizes the keelwise shape of the hull; sixth, to provide a hollow false step structure in which air is induced for ultimate escape and distribution rearwardly of the step while hydroplaning; seventh, to provide floors of a construction designed to extend laterally beyond the chines of the hull and into the fin excrescencies mentioned hereinbefore; eighth, to improve generally in the interior bracing of the fin excrescencies whereby stresses and strains, while hydroplaning, are transmitted to and distributed over an increased area of the hull proper; ninth, to provide an appropriate means whereby the extended tail is maintained in perfect longitudinal alinement with the fore-body of the craft; and tenth, to provide an improved arrangement of braces for the built-in wing spars of the hull.

Further objects and advantages of the invention will more fully appear from the following description taken in connection with the accompanying drawings.

The invention consists in the novel features and combination of parts herein disclosed in their preferred form and the invention is more particularly pointed out in the appended claims.

In the drawings, wherein like numerals of reference designate like or corresponding parts throughout the several views:

Figure 1 is a fragmentary plan view of the flying boat hull comprehended by our present invention;

Fig. 2 is a view similar to Fig. 1 illustrating in plan that portion of the boat hull undisclosed in said Fig. 1;

Fig. 3 is a vertical longitudinal sectional view of the hull illustrating only so much thereof as is shown in Fig. 1;

Fig. 4 is a similar view including that portion of the hull illustrated in Fig. 2;

Fig. 5 is a transverse section on the line 5—5 of Fig. 1;

Fig. 6 is a transverse section on the line 6—6 of Fig. 3;

Fig. 7 is a transverse section on the line 7—7 of Fig. 3;

Fig. 8 is a transverse section on the line 8—8 of Fig. 4;

Fig. 9 is a detail transverse section illustrating the arrangement of the interior fin braces;

Fig. 10 is a transverse section illustrating fragmentarily a portion of the rearwardly facing step, looking forward;

Fig. 11 is an inverted plan view of the false step structure and that portion of the hull in the immediate vicinity thereof;

Fig. 12 is a longitudinal sectional view on the line 12—12 of Fig. 11 illustrating the false step structure and that portion of the hull bottom beneath which the step structure is arranged;

Fig. 13 is a section on the line 13—13 of Fig. 12;

Fig. 14 is a fragmentary sectional view;

Fig. 15 illustrates diagrammatically the curvature of the hydroplaning bottom;

Fig. 16 is a detail elevation of one of the wing-spar fittings;

Fig. 17 is a section on the line 17—17 of Fig. 16;

Fig. 18 is a detail view of the forward W-strut fitting, and

Figure 19:
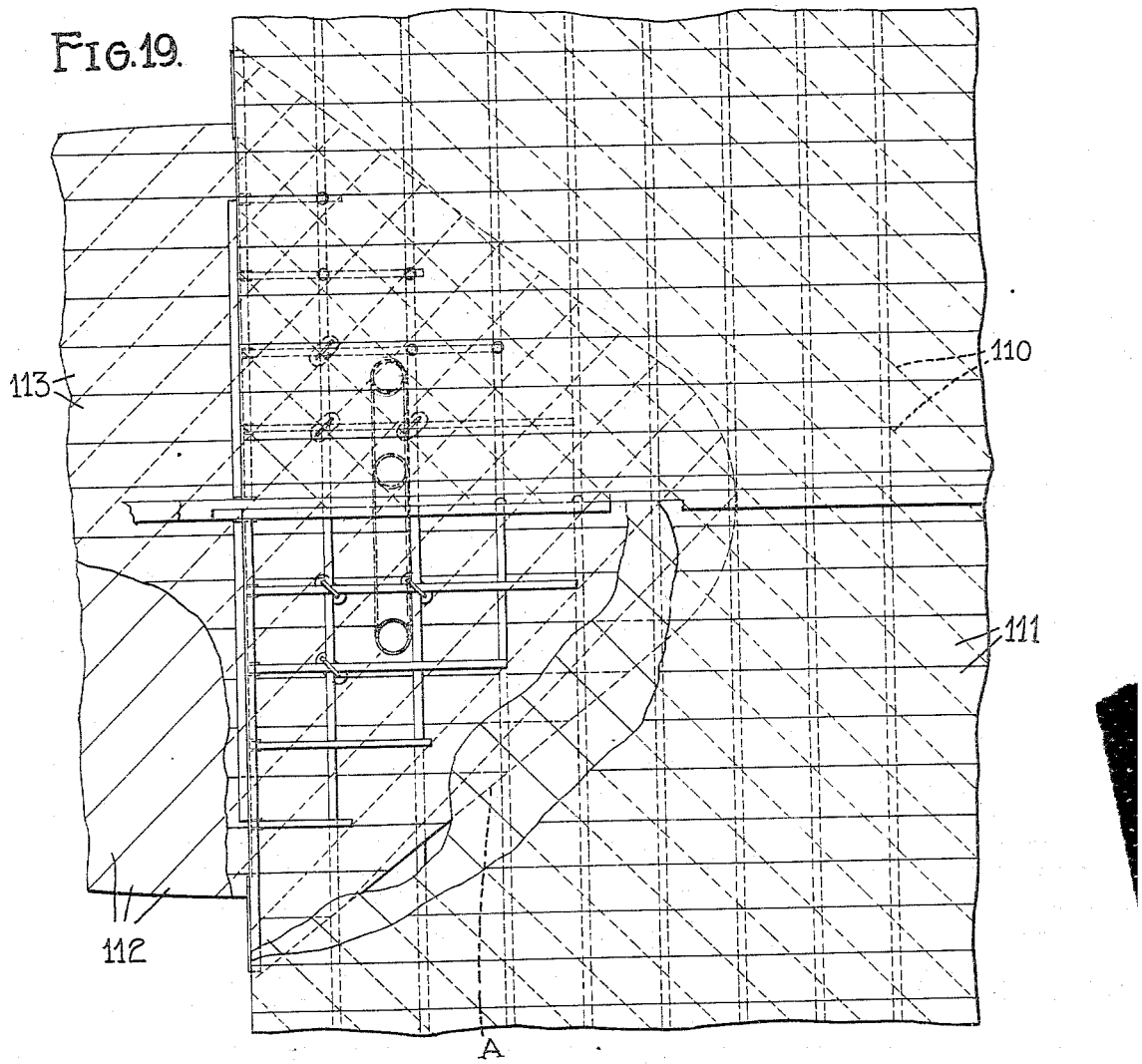
Figs. 19 and 20 illustrate a modified arrangement of bottom planking.
Figure 20:
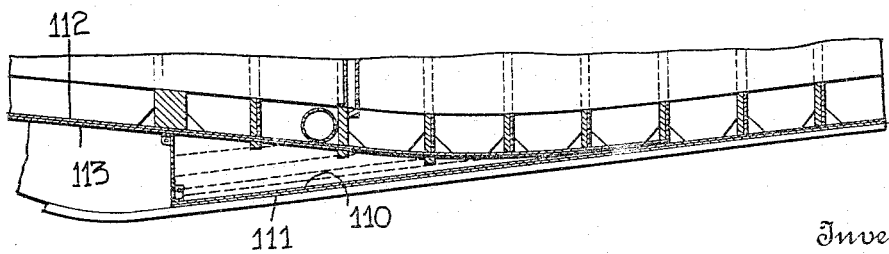

Primarily, it may be said the boat hull is essentially of streamline form, its uniform beam amidships tapering forwardly to a relatively blunt nose and rearwardly to the elongated tail upon which are supported the customary intersecting horizontal and vertical stabilizing planes together with the elevator and rudder controls. Projecting amidships is the cabin for occupancy by the aviators, the sides and top of the cabin merging integrally into the streamline of the hull proper. A window top terminates forwardly the cabin streamline, protecting the aviators from the elements, yet in no way obstructing their vision or hampering control.

In the embodiment of our invention considered preferred, access is gained to the cabin or hull interior 20 via a hatchway 21 formed in the cabin top preferably at one side thereof as illustrated in Fig. 1. Transparencies 22, together with a steel tube framework 23, afford a covering for the cabin. Ahead of the cabin, the top of the fore-body, designated in its entirety by the numeral 24, is substantially flat as indicated at 25. This flattened forward portion or deck 25 merges both laterally and forwardly into the sides and nose respectively of the fore-body of the hull.

In plan, the fore-body widens abruptly from the bow or nose to a maximum substantially amidships. In side elevation the bow may be described as blunt or abrupt in that the false keel, designated 26, continues beyond the nose end of the hull on a reverse curve whereby to terminate at a point where the forward transparencies 22 and fore-deck 25 intersect. This construction will obviate the utilization of a stem and yet enable an interior stringer arrangement of such a nature as to preclude indentation or disrupture at the nose end of the hull.

The bottom of the hull is constructed to form a salient angle fore and aft with the apex of the angle in the vicinity of the point where the bottom of the fore-body 24 and the bottom of the tail 27 merge. The tail 27 may be described as a rearward continuation of the fore-body to the stern post 28 where the sides of the hull merge in streamline form.

Panting stringers 29 brace the fore-body at the extreme forward end of the hull and with chine stringers 30 interiorly brace the hull. Floors 31, uniformly spaced and parallel, brace the hull athwartships and at the same time afford a bed or support for the cabin flooring 32. Since only the fore-body of the hull is designed for occupancy, the flooring 32 is extended aft only to a point sufficiently distant from the forward extremity thereof as to provide ample cabin floor space.

The underneath surface of the fore-body of the hull is constructed in hydroplaning form of V-shape in transverse section. Said hydroplaning bottom, designated 33 has its bow end angled more acutely than the remaining portion. This hydroplaning portion of the hull bottom is formed by planking 35 arranged to extend uninterruptedly diagonally from fin edge stringer to fin edge stringer aft of a point 34 indicated in the drawings forwardly of the hull bottom. The planking underlying the tail bottom also extends diagonally. The tail bottom planking, however, continues beyond the chine stringers to spirally encompass the entire tail. This continuity of planking is conducive to rigidity and strength heretofore unattainable where the rearwardly facing step (later to be disclosed) is formed as an integral part of the hull bottom. Longitudinal planking 36 affords an outside covering for the inner planking 35. If desired, water-tight fabric, such as linen, may be interposed between the outside and the inside planking.

It is the practice in constructing hydro-aeroplanes and flying boat hulls utilizing a rearwardly facing step to construct the step as an integral part of the hull. This is objectionable in that the bottom planking of the hull cannot be made continuous or uninterrupted and the keelson cannot be constructed to extend uninterruptedly from the fore-body into the elongated tail. As intimated hereinbefore, it is proposed by the present invention to obviate this structural disadvantage. The keelson disclosed, designated 37, not only extends uninterruptedly from the fore-body into the elongated tail but at the very point where it is ordinarily weakest, the keelson is enlarged. Floors 38 interconnect the fin-edge stringers (later disclosed) and with fillets 39 afford a bed or base for the keelson 37. Not only do the floors 38 brace the hull athwartships but by reason of their uniform curvature afford a bed or base for the integrally formed hydroplaning surface 33. The keelson extends longitudinally from a point well in advance of the center of hydroplane lift to the stern post 28 where it is fastened or made rigid by any suitable means. The fillets 39 underlie the keelson throughout its entire length. If desired, the fillets may be cut away as indicated at 40 to permit an equal distribution of weight interiorly of the hull should water seep in at one side only. As a brace for the keelson 37, a center line stringer 41 is provided and arranged thereover to extend longitudinally throughout that portion of the length of the keelson designed to receive the greatest stresses and strains while hydroplaning. A lattice work of diagonal braces 42 transmits impact stresses directly from the keelson to the center line stringer 41. From the center line stringer the stresses are transmitted to the hull sides, throughout which they are distributed by the floors 31 and flooring 32 which engage therewith. The floors 31 not only mount the flooring but directly and effectually brace and support the center line stringer 41.

Fin excrescencies, each designated as an entirety by the numeral 43, increase the hydroplaning area and the hull displacement. Fin edge stringers 44 define these fins marginally, each extending rearwardly from points at the extreme forward end of the fins to points at the rear outer edges thereof. The fins from the stringers 44 whereat they are edged, widen perceptibly inboard for increased strength. In fact, the topside planking 45 of each fin is flared outwardly as indicated at 46 that the interior fin bracing may be appreciably increased.

The terminals of the floors 31 are curved as indicated at 47 and extended outwardly beyond the plane of the vertical sides of the hull proper to engage with the fin-edge stringers 44 and collectively afford a base or support for the fin top-side planking 45. The fins are thus braced continuously and uninterruptedly from stringer to stringer through the hull and to the keelson 37 of which the center line stringer 41 is in reality a part. This construction we consider of the utmost importance in that the floors 31 may be said to serve, firstly, as a bed or base for the flooring 32, secondly, as a transverse brace for the keelson 37, and thirdly as a brace for the fin excrescencies and support for the fin top-side planking 45. The terminals 47 of the floors 31 actually constitute the fin frames.

In transverse section the hydroplaning bottom of the hull is outwardly convexed in the vicinity of the keelson to extend uninterruptedly athwartships and uniformly concave in the vicinity of each chine stringer or each fin excrescency to present to the water what is known in the art as a hydroplaning bottom of the wave collecting type. In other words, the bottom, laterally of the keelson, is symmetrically curved upwardly and outwardly and thence outwardly and more horizontally to the fin-edge stringers 44. The desired V-form is thus still retained with the added advantage (referred to above) resulting from the curvilinear form in transverse section in the vicinity of the fins.

The false step structure, designated in its entirety by the numeral 48, unlike prior structures, is made separate from or as a non-integral part of the hull and located in the vicinity of a line projected vertically through the center of gravity designated C. G. From a point 49, well toward the rear of the hydroplaning surface, the false step planking or bottom 50 continues said hydroplaning surface aft rearwardly beyond the apex of the saliency which characterizes the keelwise shape of the hull. Said false step planking 50 terminates abruptly at the false step steel floor herein designated 51, the mentioned floor engaging with the underneath surface of the reversely inclined bottom portion of the hull to which it is fastened or secured by any suitable means and as indicated at 52. By making or constructing the particular floor 38 directly above the steel floor 51 somewhat thicker than the remaining floors, the said floor 51 is effectually and rigidly braced. In configuration, the top or hull engaging surface of the false step structure is made substantially complemental to the underneath configuration of the hull and of material sufficiently distortable to permit of slight fore and aft adjustment subsequent to assembly should it be found necessary to move the step in effecting adjustment with respect to the center of gravity of the craft. Intersecting transversely and longitudinally disposed stringers 53, connected as indicated at 54 at their points of intersection, constitute with the planking 50, the steel floor 51, and an edge plate 55, the false step structure in its entirety. The edge plate 55 is preferably forwardly tapered as indicated at 56 so as not to interrupt the continuity of the hydroplaning area where the bottom integral planking of the hull merges into the bottom false step planking of the false step structure 48. Bolts 57 penetrate the edge plate and the bottom planking of the hull to constitute with the fastening means 52 above disclosed the securing means for the false step structure.

Upon reference to Figs. 3 and 12, it will be observed that the false step structure 48 is divided fore and aft by a skeg 58 having an overall length extending rearwardly from a point where the bottom planking 50 of the false step structure merges with the integral bottom planking of the hull to a point not very far removed but considerably aft of the steel floor 51. The false keel 26 lies contiguous to the skeg 58 and, as stated, extends lengthwise the hull from nose to stern. The false step steel floor 51 comprises duplicate sections arranged at opposite sides of the skeg 58, each section extending laterally sufficiently to underlie the fin excrescencies which terminate abruptly in lateral alinement with the step. Each step section is flanged as indicated at 59 to afford a securing surface and apertured as indicated at 60 to provide air and water drain holes for a purpose later to be disclosed. More perfect drainage is made possible by drain holes 61 formed in each steel floor section 51 adjacent the bottom edge thereof.

For the induction of air beneath the hull and immediately aft of the step a breather tube 62 is provided, the said tube opening interiorly of the hull and in a plane above the water line and exterior thereof at each side of the skeg 58 intermediate the hull bottom and the false step bottom 50. The false step structure being hollow, air is indrawn from the hull interior into the breather tube and distributed equally at opposite sides of the skeg for ultimate escape through the apertures or air holes 60 formed in the rearwardly facing step. A branch pipe 63, elbowed at its ends provides for an equal distribution of the air at opposite sides of the skeg. The admission of air beneath the false step insures also prompt discharge of water therefrom.

Bulkheads designated respectively as they progress aft 64, 65, 66, 67, 68 and 69, transversely brace the hull from end to end and at the same time divide the hull into several communicating compartments. Each bulkhead is water-tight although the bulkheads 68 and 69 only extend from top to bottom of the hull. These two bulkheads are each equipped with a man-hole 70 of appropriate design. The forward bulkhead 64 is located in the approximate vertical plane of the point 34 designating the center of hydroplane lift, the bulkhead 65 in the approximate vertical plane of the point where the false step bottom and hydroplaning bottom merge and the bulkheads 66 and 67 respectively beneath the wing spars 71 and 72 which are built in and extend transversely through the hull below the top thereof. These four bulkheads terminate short of the top of the hull, the two forward bulkheads extending upwardly from the bottom only so far as the flooring 32. Stiffeners 73, angularly arranged, brace each the bulkheads 68 and 69, the stiffeners constituting with the floors of the tail a substantially triangular bulkhead brace of rigid form. The said two rear bulkheads are preferably made up of bulkhead sections connected as indicated at 74.

Not only do the stiffeners 73 brace the bulkheads but with the tail frames 75 which they intersect afford a fastening means for the tail wiring 76. The wiring for the tail is cross arranged as indicated in Fig. 4, engaging at the top and bottom of each the bulkheads 68 and 69, the stern post 28, and the bulkhead 67 at its base.

Side stringers 77 extend longitudinally of the tail portion of the hull from the base of the bulkhead 68 into the fore-body on a forwardly and upwardly inclined curve, each stringer engaging beneath the rear wing-spar 72 and abutting the forward wing spar 71 where it terminates. Diagonals 78 brace the chine stringers 30 to the forward wing spar 71, each diagonal engaging with the chine stringers at a point where the greatest impact occurs while hydroplaning.

The built-in wing spars project without and laterally beyond the sides of the hull a considerable distance as indicated in Figs. 6 and 7, thus constituting a rigid engine section panel and an anchorage for the remaining wing panels (not shown). Struts constituting together a substantially W-form strut brace each wing-spar to the interior of the hull. The outer diagonal struts of the forwardly located W-form struts are designated 79. These struts extend inwardly at an angle from the outer terminals of the forward wing-spar to engage with the fin excrescencies through which they are braced in a manner hereinafter disclosed directly to the chine stringers which extend adjacent the fins. The struts 80, forming with the struts 79 the forward W-brace, do not extend without the hull but engage respectively the wing-spar 71 equidistant from its ends and the chine stringers at points where the struts 79 engage. The spar sections which constitute the wing-spar 71 mate interiorly of the hull so as to present in substance a continuous spar from end to end. The struts 81 and 82 which brace the rear wing-spar are arranged quite similarly to the forward wing-spar struts in that they are W-arranged and engage respectively the chine stringers and the wing spar. The outside struts 81, however, penetrate the hull sides and not the hull fins. Center struts 83 and 84 engage respectively the spars 71 and 72 at one end and the keelson 37 at the other. The center struts also afford a stiffening means for the intermediate bulkheads 66 and 67. By these means the spars are anchored directly to the side stringers and keelson.

At the very aft end of the extended tail 27, torque stringers 85 are disposed. These stringers extend inwardly and upwardly from the chine stringers adjacent the rear bulkhead 69 to a point adjacent the upper end of the stern post 28 where they are both fastened by any suitable means. The particular twist or curvature thus given the torque stringers will not only effectually brace the extended end of the tail, but by reason of their convergence preclude distortion from a normal position perfectly alined with the hull as a whole. Knees 86, located respectively at the top and bottom of the stern post 28, amplify the tail strength at a point where the keelson, bottom planking, top-side planking and stringers merge. The extended end of the tail is further equipped with a tail skid 87 of a construction designed to extend rearwardly beyond the stern post so as to flex or fulcrum thereon under emergency conditions.

Cross arranged fin braces 88 and 89 interiorly brace the fin excrescencies and as suggested hereinbefore transmit the hydroplaning stresses and strains to the body of the hull proper, the braces 88 extending inwardly at an angle from the fin hydroplaning surface adjacent the fin edge stringers 44 to the vertical hull sides in a manner affording a base or support for that portion of the fin top-side planking flared or extended outwardly as indicated at 46.

Although the forebody is designed to receive the heaviest strains, the tail portion, because of the weight of the empennage must be effectually braced. To this end compression pieces 90, the tail top-side frames 75 and doubling 92 are provided. Each function to some extent in distributing the strain incident to alighting. The compression pieces are preferably located at the points where the bulkheads 68 and 69 contact with the underneath surface of the top-side planking of the tail.

In Figs. 16, 17 and 18 we have illustrated fittings particularly adapted for the purposes intended. The fittings 93 (of which there are two) may be described as comprising duplicate metallic plates 94. These plates, as indicated in Fig. 17, engage with the wing spars 71 and 72 and afford not only a fastening means for the mating wing spar sections but an anchorage for the diagonal struts 80, and 82 and the center struts 83 and 84. In fact, the fittings are shaped or stamped to provide ears 95 which overlie the various struts to which they are securely fastened. Braces 96 and wires 97 also engage with these fittings and interconnect the superposed supporting surfaces (not shown). Bolts 98 are utilized as the fastening means.

The fittings 99 form in reality a part of the forward W-arranged wing spar brace. Each fitting comprises a plurality of radial legs 100 of unequal length, the legs functioning to transmit the strains from the outside diagonal struts 79 to the chine stringers 30 and thence to the inside diagonal struts 80 or vice versa. The fittings further comprise a pin 101 which is adapted to engage in a socket therefor formed in the struts 79. Web pieces 102 underlie the floors 47 and engage with the chine stringers 30. The web pieces 102 which the fittings 99 engage are braced as indicated at 103. In other respects the web pieces are of a uniform construction throughout.

In the diagrammatic view, Fig. 15, the curvature of the hydroplaning surfaces is advantageously shown. As before pointed out, the V-bottom form is retained and at the same time a reverse curve provided marginally of the hull. Through such a construction the planking continuity may be maintained and the boat bottom structure materially strengthened.

The modified bottom planking arrangement illustrated in Fig. 19, eliminates all possibility of the water ripping and tearing loose the edge plate and false step planking of the preferred form. From the nose end aft to the step, the bottom of the hull is constructed of diagonal planking 110 and fore and aft planking 111 superimposed. From the point of maximum saliency aft to the stern post the bottom is constructed of diagonal planking 112 (arranged to extend oppositely to the forward diagonal planking) and fore and aft planking 113 superimposed. Four thicknesses of planking are thus provided at the step without obstructing the continuity of the hull bottom. The two inside thicknesses may be described as continuing the tail bottom planking forwardly beyond the step to the point of maximum saliency and the two outside thicknesses as continuing the hydroplaning bottom planking rearwardly and uninterruptedly beyond the point of maximum saliency and tangentially to the step. Even such little flight resistant area as the edge plate might offer is in this way avoided. The sides and deck of the hull, in this modified planking arrangement, are covered with fore and aft planking throughout. In other words, the two inside thicknesses of bottom planking at the step may be described as a forwardly extended tongue of the tail bottom planking beneath the outside planking. See dotted line A, Fig. 19 which indicates the termination point of said extended tail planking.

By constructing the bottom of the hull longitudinally salient, it is possible to rock fore and aft and as a result fly from the water after gaining flying speed. Were the bottom rectilinear throughout, this rocking action would be impossible. This is a distinct characteristic of all flying boat hulls. The function of the fins is evident. They augment the hydroplaning area of the hull laterally and increase the hull displacement without proportionately increasing head resistance during flight. Were the width of the fore-body throughout the same as the width of the hydroplaning bottom, much unnecessary weight would be added to the craft and the head resistance or drag increased. The fins also, broadly, form a characteristic of Curtiss flying boats.

Although we have described more or less precise forms and details of construction, we do not intend to be understood as limiting ourselves thereto as we contemplate changes in form, the proportion of parts and the substitution of equivalents as circumstances may suggest or render expedient and without departing from the spirit of the invention as claimed.

What is claimed is:

1. A false step structure for flying boat hulls comprising a step-floor, an interior framework, and covering for the framework merged uninterruptedly into the hull bottom.

2. A false step structure for flying boat hulls comprising a step-floor, a covering for the false step structure of which the floor is a part, and a skeleton framework forming with said floor a foundation for said covering.

3. In a hull for flying boats, a built-on false step structure, and a securing means for the step structure including an edge-plate having a tapering forward edge.

4. A false step structure for flying boats comprising a skeleton framework of gradually decreasing depth forwardly and laterally, a step-floor of gradually decreasing depth toward its ends, and a covering for the framework having its forward and lateral marginal edges merged uninterruptedly into the hull bottom and its rear marginal edge terminated abruptly in the vertical plane of the floor.

5. In a hull for flying boats, an apertured step-floor, a skeleton framework, a covering forming with the framework and step-floor a hollow false step structure, and air induction means having its discharge terminus open to the interior of said structure.

6. In a hull for flying boats, a skeleton framework for the hull bottom, a bottom covering for the hull framework continuous throughout, a false step structure comprising a skeleton framework attached to said body against the bottom covering of the hull, and a bottom covering for the false step structure framework, the two covers at the leading edge of the false step structure merging one into the other.

7. In a hull for flying boats, a skeleton framework for the hull bottom, a false step structure comprising a skeleton framework attached to said body, a bottom covering for the hull framework uninterrupted at the false step structure, and a covering for the false step structure framework spaced beneath said hull framework covering at the step although merged thereinto forwardly of said step.

8. In a hull for flying boats, a keelson, a center-line stringer, floors bracing the stringer athwartships, a connection between the keelson and the stringer and floors bracing the keelson athwartships.

9. In a hull for flying boats, a fore-body, a tail, a keelson, and a rearwardly facing step designed to underlie the keelson without an interruption in the continuity thereof and without necessitating the formation of a break in said bottom at the juncture of the fore-body and the tail.

10. In a hull for flying boats, a fore-body, a tail, the underneath surface of the hull at the juncture of the fore-body and the tail being curvilinear longitudinally, and a false step terminating the under surface of the fore-body in proximity to its juncture with the tail.

11. In a hull for flying boats, fin excrescencies formed thereon, and a false step structure designed to underlie said bottom and to extend out laterally beneath the fin excrescencies.

12. In a hull for flying boats, a hydroplaning bottom of V-form in transverse section throughout the greater portion of its length, the V-form merging to flatness at the after end of said hydroplaning bottom, and a false step structure having a V-formed bottom, said structure being fastened to the flattened portion of the hydroplaning bottom to continue the V-form of said hydroplane bottom aft.

13. A hull for flying boats including a stepped bottom, a keelson extended from the forward end of the hull rearwardly beyond the step, a center line stringer, means interconnecting the keelson and stringer in advance of the step, and means interconnecting the stringer and the sides of the hull.

14. In a hull for flying boats, a keelson, a stringer, a means diagonally bracing the keelson to the stringer, and floors bracing the stringer to the sides of the hull.

15. In a hull for flying boats, a tail portion, a vertical stern post at the rear end of the tail, a keelson and torque stringers for preventing distortion of the tail, the arrangement of the stringers being such that they converge angularly upwardly from the plane of the bottom of the tail for connection with the stern post at or near its upper end.

16. In a hull for flying boats, the bottom of the hull being constructed to form a salient angle fore and aft, and a false bottom arranged to continue the forward angular portion of the hull bottom aft beyond the apex of said angle.

17. In a hull for flying boats, the bottom of the hull forming a salient angle fore and aft, and a false bottom arranged to extend the forward portion of the angular hull bottom aft beyond the apex of the angle and to merge forwardly into the said hull bottom.

18. In a hull for flying boats, a hull bottom longitudinally curved, and a step structure having its bottom surface tangent to that portion of the hull bottom ahead of its point of maximum convexity.

19. In a hull for flying boats, the hull bottom forming a salient angle fore and aft, and a false bottom arranged to continue the forward angular portion of the hull bottom aft beyond the apex of the angle and in spaced relation to the rear angular portion of the hull bottom.

20. In a hull for flying boats, a false step structure attached directly to the hull bottom, and a skeg extended into the false step structure to strengthen it.

21. In a hull for flying boats, a false step structure attached to the hull bottom, a skeg extended into the false step structure to strengthen it, and air induction means open to the false step structure respectively at opposite sides of the skeg.

22. In a hull for flying boats, a hollow false step structure formed upon the hull bottom, means dividing the step structure longitudinally, and a branched air induction pipe having its branch terminals discharging respectively into the hollow step structure respectively at opposite sides of said dividing means.

23. In a hull for flying boats, fin excrescencies located at opposite sides of the hull, and a means transversely bracing the fins to and through the hull.

24. In a hull for flying boats, fin excrescencies located at opposite sides of the hull, and floors extended laterally beyond the sides of the hull into the fin excrescencies.

25. In a hull for flying boats, fin excrescencies located at opposite sides of the hull, fin-edge stringers, and a means transversely bracing the stringers to and through the hull.

26. In a hull for flying boats, fin excrescencies located at opposite sides of the hull, and floors supporting both the interior hull flooring and the fin top-side planking.

27. In a hull for flying boats, fin excrescencies located at opposite sides of the hull, and floors arranged to pass transversely through the hull and beyond the sides thereof to function dually as flooring supports and as fin top-side supports.

28. In a hull for flying boats, fin excrescencies located at opposite sides of the hull, and interior fin braces cross arranged.

29. In a hull for flying boats, fin excrescencies located at opposite sides of the hull, a keelson, and floors functioning as flooring supports, as fin top-side planking supports, and as keelson braces.

30. In a hull for flying boats, a keelson, an interior hull flooring, and a means dually functioning as a flooring support and as a keelson brace.

31. In a hull for flying boats, fin excrescencies located at opposite sides of the hull, a keelson and vertically separated floors inter-connecting the opposed fin excrescencies both via the keelson.

32. In a hull for flying boats, built-in wing spars, chine stringers, and a means diagonally bracing the chine stringers rearwardly to one of said spars in the approximate vertical plane of the point where the greatest impact is in evidence while hydroplaning.

33. In a hull for flying boats, built-in wing-spars, chine stringers, side stringers extending aft from the forward wing-spar, and a means diagonally bracing the chine stringers to the forward wing-spar and to the point where the side stringers abut.

34. In a hull for flying boats, built-in wing-spars laterally extending beyond the sides of the hull, chine stringers, and a means diagonally bracing the extended terminals of each wing-spar through the hull sides and directly to the chine stringers.

35. In a hull for flying boats, built-in wing spars, chine stringers, and braces V-arranged to engage respectively the chine stringers and the wing-spars and to penetrate the sides of the hull.

36. In a hull for flying boats, opposed fin excrescencies, a hydroplaning bottom curvilinear athwartships, and floors of uniform curvature affording a base for said bottom.

37. In a hull for flying boats, opposed fin excrescencies, fin-edge stringers, a hydroplaning bottom curvilinear athwartships, and floors of uniform curvature from a point well forward to a point substantially amidships, the floors collectively affording a base for the hydroplaning bottom and the fin-edge stringers.

38. In a hull for flying boats, fin excrescencies located at opposite sides of the hull in lateral continuation of the hull bottom, and superposed series of floors extended across the hull and into the fin excrescencies for supporting and bracing the hull bottom, the fin bottoms, and the top surfaces of the fins.

39. In a hull for flying boats, fin excrescencies formed on the sides of the hull, upwardly and inwardly inclined fin top-side covering, an interior fin frame work comprising braces arranged to extend upwardly and inwardly at an angle greater than the corresponding angular inclination of the top-side covering, and a covering for such portions of the fin braces as extend above the angular plane of the fin covering.

In testimony whereof we affix or signatures.

HENRY KLECKLER.
CHARLES G. MacGREGOR.